United States Patent

[11] 3,542,147

| [72] | Inventors | Horacio Shakespear<br>Troy;<br>Frank J. Winchell, Orchard Lake,<br>Michigan |
|---|---|---|
| [21] | Appl. No. | 710,489 |
| [22] | Filed | March 5, 1968 |
| [45] | Patented | Nov. 24, 1970 |
| [73] | Assignee | General Motors Corporation<br>Detroit, Michigan<br>a corporation of Delaware |

[54] MOTOR VEHICLE BODY-CHASSIS SYSTEM
25 Claims, 7 Drawing Figs.

[52] U.S. Cl................................................... 180/64,
180/42, 180/44, 180/71, 280/124
[51] Int. Cl........................................................ B60k 5/12,
B62d 27/04
[50] Field of Search............................................ 180/42, 64,
44

[56] References Cited
UNITED STATES PATENTS

| 1,948,745 | 2/1934 | Curtiss | 180/64X |
| 2,079,218 | 5/1937 | Ledwinka | 180/64X |
| 2,105,153 | 1/1938 | Ledwinka | 180/64X |
| 2,373,356 | 4/1945 | Thoms et al. | 180/64X |
| 3,101,126 | 8/1963 | Herr | 180/64 |
| 3,219,138 | 11/1965 | Kishline | 180/64X |

FOREIGN PATENTS

| 435,392 | 9/1935 | Great Britain | 180/64 |

*Primary Examiner*—A. Harry Levy
*Attorneys*—W. E. Finken and D. L. Ellis

ABSTRACT: A motor vehicle body-chassis system in which the engine and transmission are connected to a wheel supporting axle at the opposite end of the vehicle to form a rigid driving aggregate, with the engine elastically and kinematically supported on a front suspension unit, the body being supported entirely on the driving aggregate by longitudinally-spaced elastic mounts located substantially in vertical planes containing the first mode beaming nodal points of the aggregate and having natural frequencies low enough to prevent transmission to the body of substantially all engine induced vibration.

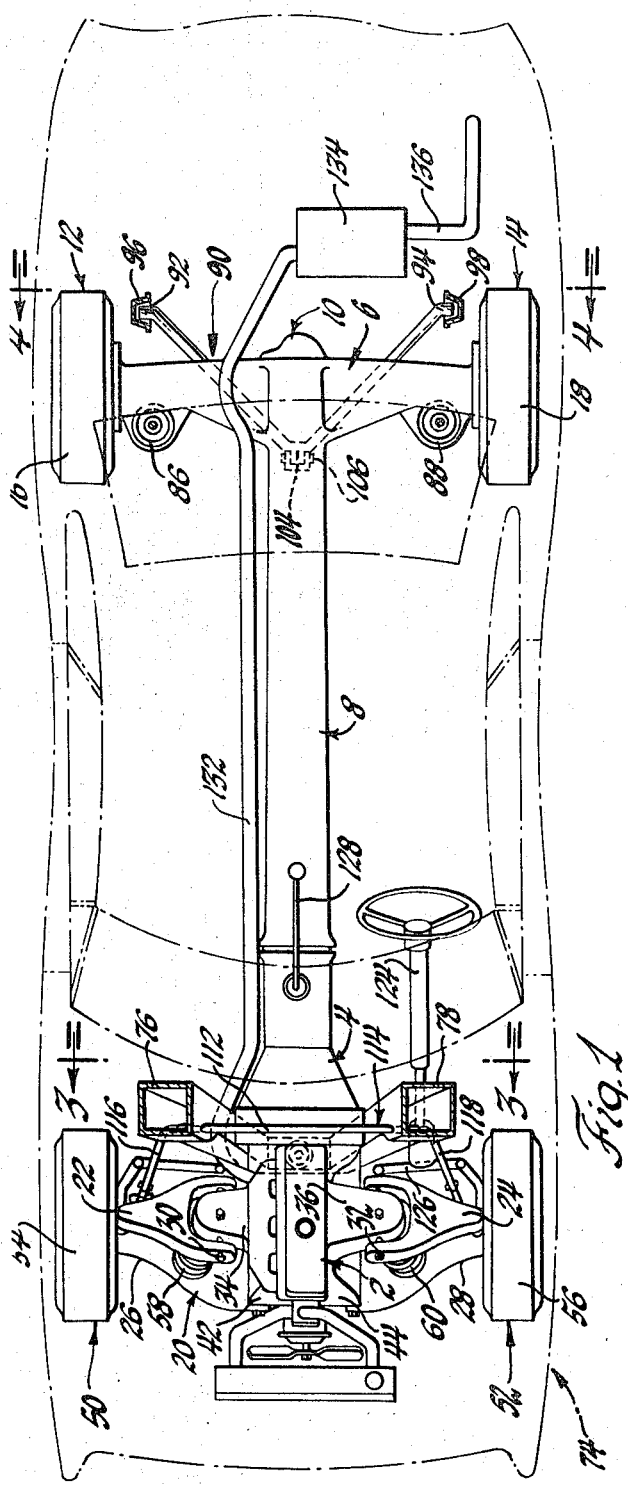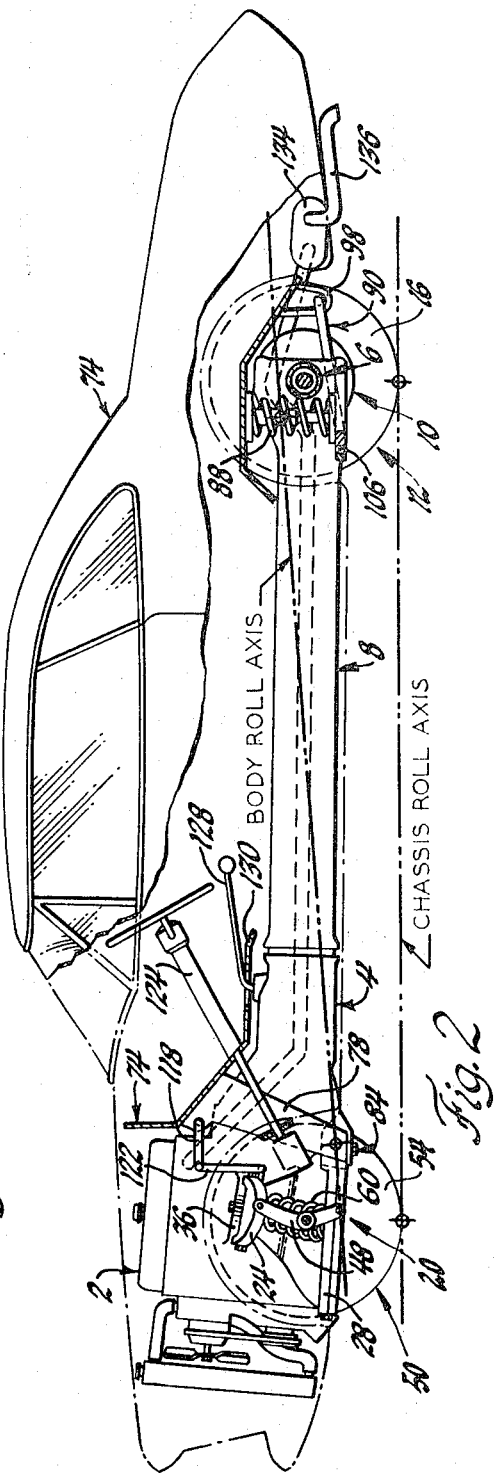
INVENTORS
Horacio Shakespear, &
BY Frank J. Winchell
W. H. Wagner
ATTORNEY Patented Nov. 24, 1970 3,542,147

INVENTORS
Horacio Shakespear, &
BY Frank J. Winchell

W. F. Wagner
ATTORNEY

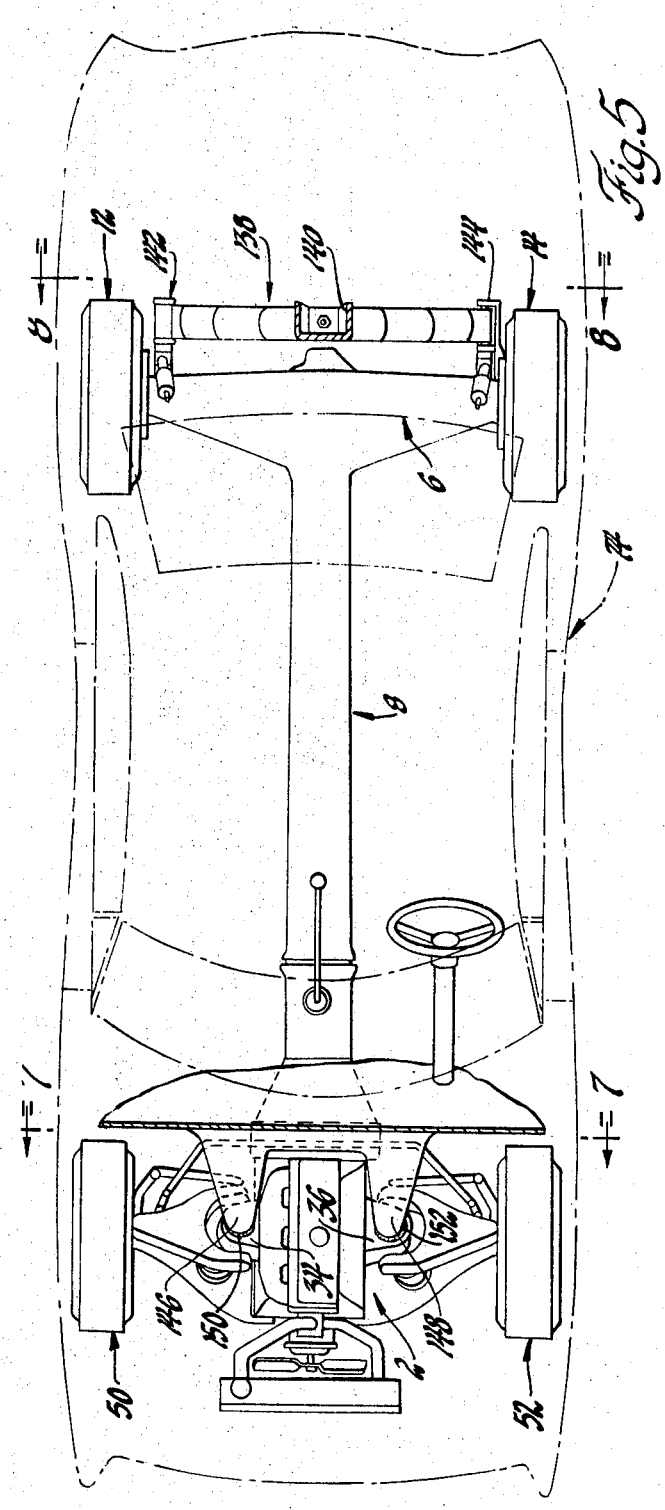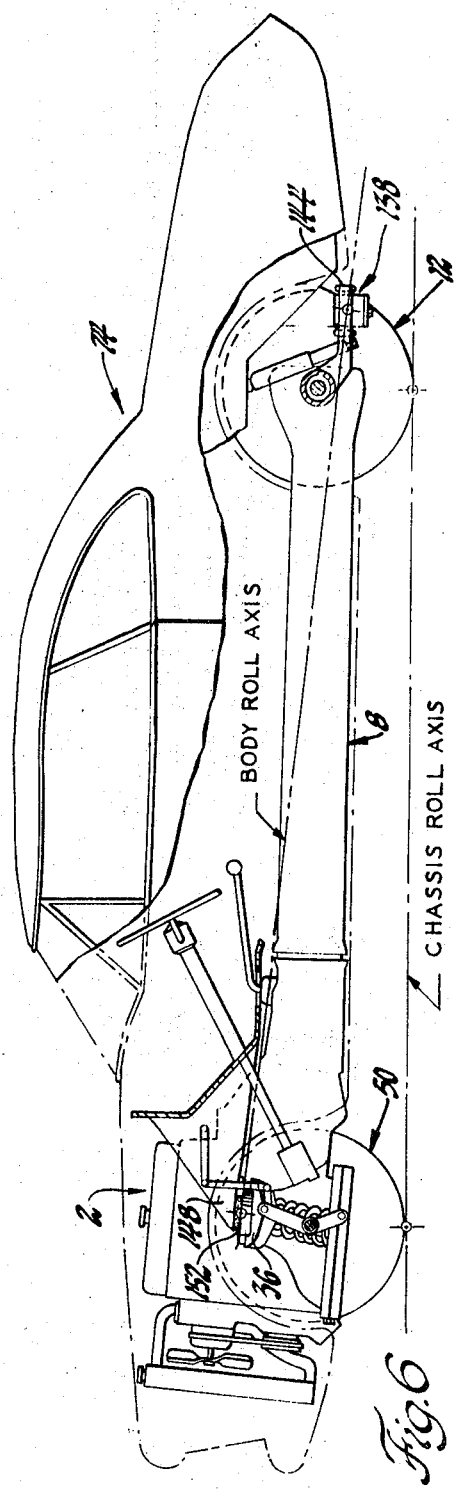

INVENTORS
Horacio Shakespear, &
BY Frank J. Winchell
W. H. Wagner
ATTORNEY

INVENTORS
Horacio Shakespear, &
BY Frank J. Winchell
W. F. Wagner
ATTORNEY

MOTOR VEHICLE BODY-CHASSIS SYSTEM

FIELD OF INVENTION

This invention relates to basic vehicle construction and kinematics and dynamics of body-chassis systems.

Throughout the history of automobile manufacture, engineers have continuously sought, often with notable success, to improve comfort, handling, performance, and dependability of all classes of vehicles. However, as in all technological fields, success has not always been achieved without penalty in the form of substantially higher cost. Consequently, success in perfecting economical transportation has generally been more elusive than that achieved in the so-called luxury cars. Thus, the lightweight inexpensive small car equipped with a simple four-cylinder engine has in the past typically exhibited less improvement in terms of comfort, ride characteristics, quietness, etc., than have the larger heavier vehicles utilizing inherently more expensive but smoother eight-cylinder engines, more intricate chassis and body structure, refined suspension, costly noise and vibration isolation media, etc.

DESCRIPTION OF THE PRIOR ART

The past is, however, not lacking for numerous efforts to achieve improvement in engine mounting, body isolation, etc., in economical cars. Nevertheless, the results have consistently been at best marginal in comparison with the larger cars in which cost is relatively less critical. Of several inherent basic problems which have consistently resisted resolution, one of the most significant has been the fact that economical and otherwise suitable four-cylinder engine designs tend to generate vertical force impulses and oscillatory vibration which if transmitted to the passenger compartment produce undesirable audible and inaudible vibration. In coping with this problem, engineers were faced with the dilemma of either resorting to elaborate engine vibration suppression techniques or allowing free oscillation and vertical movement of the engine. In past practice, vibration suppression has proved unsatisfactory due to the fact that the natural frequency of mountings capable of affording the requisite degree of vibration amplitude control is too high to prevent transmission of engine generated vibrations to the body. On the other hand, mountings allowing free oscillation of the engine also permitted excessive engine oscillation amplitude and complicated the problem of transmitting driving thrust from the driven wheels to the vehicle sprung mass.

SUMMARY OF THE INVENTION

The present invention is directed generally to a motor vehicle in which the engine and transmission, located at the front end of the vehicle, are connected to a transverse axle housing at the rear end of a vehicle by a torque tube or beam to form an essentially rigid driving aggregate or unit. The axle end of the aggregate is directly supported relative to the road by rear wheels having pneumatic tires, while the engine end of the chassis is elastically and kinematically supported on a suspension unit mounted on dirigible front wheels having pneumatic tires, in a manner assuring laterally stable positioning of the engine and maintenance of tracking alinement of the front and rear wheels without impeding vertical and roll deflection of the driving aggregate relative to the front suspension unit. The body in turn is resiliently mounted directly on the driving aggregate by suspension springs disposed between the rearward portion of the body and the rear axle and by elastic means disposed between the forward portion of the body and the engine end of the aggregate. Because the driving aggregate and front suspension unit do not depend upon the body for structural integrity, body mounts are selected which exhibit a natural frequency sufficiently lower than the lowest frequency generated by engine operation as to assure prevention of transmission of engine vibration to the body. Additionally, these mounts are located longitudinally of the vehicle so as to substantially coincide with the first mode bending nodal points of the driving aggregate and thereby diminish or eliminate input of forces to the body which result from such bending.

The present invention is, therefore, fundamentally concerned with achieving in a small economical car, ride, handling, quietness and vibration isolation qualities comparable or superior to heavier, more expensive, vehicles.

Exhaustive investigation has shown that the following significant objects, advantages and features are attained by the present invention:

provision of a vehicle system which effectively isolates the body from both engine and road induced impulses and permits separation of function between body and chassis;

provision of a system in which integrity of front to rear wheel and axle alinement is achieved and maintained throughout all operating conditions totally independent of the body thus enabling utilization of body mounts of sufficiently low natural frequency as to assure optimum filtering of input forces emanating from the chassis;

enablement of utilization of a simplified body construction requiring less torsional and beaming stiffness;

enablement of location of body mounts at essentially the nodal points of the chassis in first mode bending to minimize energy input from chassis to body resulting from such bending;

provision of a system in which the sprung weight of the vehicle is composed essentially of two separate masses, the body and the engine end of the chassis with a compound elastic mounting system arranged in series relation between the front suspension, engine and body so that the engine mass functions as an inertia damper with respect to road induced forces impressed on the front wheels;

provision of a system enabling establishment of separate roll axis for the body and chassis, whereby handling, stability, and control characteristics dependent upon the roll axis of the chassis are unaffected by the roll axis of the body;

provision of a construction in which the roll angle of the body responsive to a given lateral acceleration is significantly less than that of conventional vehicles of corresponding overall size and weight; and provision of a construction affording wide latitude in choice of body and chassis roll couple distribution.

With respect to all of the foregoing objectives, as noted previously it is to be emphasized that relatively simple and economical four-cylinder engines, a prime source of unwanted vibration in conventional construction, may be utilized without attendant degrading of the desirable results attained by the invention. Thus, for example, the normal relatively high vertical impulse forces characteristic of certain economically and otherwise desirable four-cylinder engines are accommodated by the present invention rather than constituting an expensive, if not insoluble, obstacle to achievement of acceptable vibration isolation. This is not to say, however, that the numerous superior qualities of the present invention are in any way limited exclusively to vehicles having four-cylinder engines but rather that the capabilities of the invention enable utilization of any desired power plant without reference to its potential as a source of vibration.

The foregoing and other objects, advantages and features of the invention, together with various modifications thereof will become more readily apparent as reference is had to the accompanying specification and drawings wherein:

FIG. 1 is a plan view, partly in section, of an automotive vehicle constructed in accordance with the invention;

FIG. 2 is a side elevational view, partly in section and with parts broken away, of the vehicle shown in FIG. 1;

FIG. 5 is a plan view partly in section, of a modified form of the invention;

FIG. 6 is a side elevational view, partly in section of the vehicle shown in FIG. 5;

Figure 15:
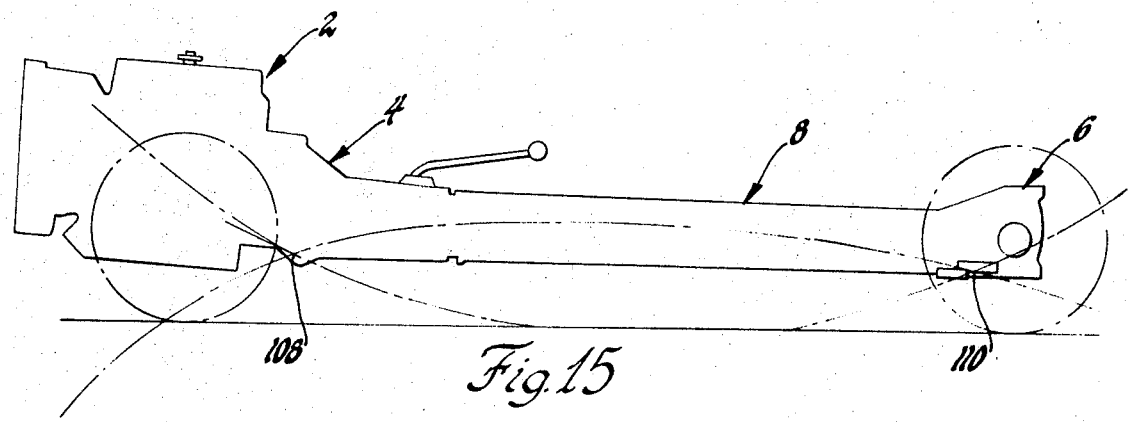
Figure 16:
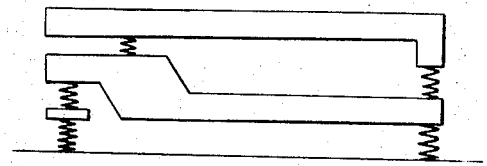
Figure 17:
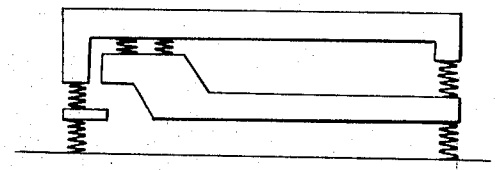

FIG. 15 is a diagrammatic view of the chassis portion of the vehicle illustrating the location of the nodal points thereof in the first mode bending deflection; and FIGS. 16 and 17, respectively are comparison diagrams of the fundamental arrangement of masses and springs in the present invention as compared with conventional prior art constructions. DESCRIPTION OF THE PREFERRED EMBODIMENT In FIGS. 1, 2, 3 and 4, there is illustrated a preferred form of the invention wherein the vehicle engine 2, transmission 4 and transversely disposed rear axle 6 are connected together by a longitudinally extending torque tube or beam 8 to form an essentially rigid unit hereinafter to be referred to as a unitary driving aggregate. The rear axle housing 6 contains conventional axle shafts, not shown, which are operatively connected at their inboard ends to a conventional differential assembly 10 and at their outboard ends rotatably support rear wheels 12 and 14 upon which are mounted pneumatic tires 16 and 18. Differential 10 operatively engages a conventional drive shaft, now shown, located within torque tube 8. It will be understood that the forward end of the drive shaft is operatively connected to the vehicle transmission 4 in order to transmit engine generated torque to the rear wheels 12 and 14.

According to a primary feature of the invention, the engine end of the driving aggregate is resiliently supported relative to the ground directly on a front suspension unit 20 (in contrast to the usual practice of supporting the engine on the vehicle frame or body frame, which in turn is then supported on the front suspension). As seen best in FIG. 3, the front suspension unit comprises transversely oppositely extending wishbone-type upper control arms 22 and 24 and transversely oppositely extending wishbone type lower control arms 26 and 18. Upper control arms 22 and 24 are pivotally connected along longitudinally-extending axes 30 and 32 to laterally oppositely-extending projections or brackets 34 and 36 formed on the engine 2, while the inboard ends of the lower control arms 26 and 28 are similarly pivotally connected along longitudinally-extending axes 38 and 40 to depending projections 42 and 44 also formed on the engine. The outboard ends of the respective upper and lower control arms are connected to steering knuckle assemblies 46 and 48 to dirigibly and rotatably supported front wheels 50 and 52 having pneumatic tires 54 and 56 mounted thereon. Resilient support of the engine end of the driving aggregate is accomplished by interposing primary suspension coil springs 58 and 60 between spring seats 62 and 64 on lower control arms 26 and 28 and spring seats 66 and 68 formed on the lower surfaces of projections 34 and 36. Suitably-valved direct-acting shock absorbers 70 and 72 are interposed concentrically within springs 58 and 60. When arranged in the manner thus far described, it will be apparent that the total vehicle chassis (the unitary driving aggregate plus the front suspension unit) produces a kinematically complete and stable structure which maintains precise front to rear wheel and axle alinement, while at the same time maintaining the engine end of the aggregate in a laterally stable position between the front wheels, yet allowing conventional geometric excursion of the front wheels consonant with optimum handling and control characteristics desired. Consequently the vehicle body 74, in contrast to conventional practice, is not required to perform any function in accomplishing front to rear structural integrity and alinement of the chassis. Therefore, in accordance with the present invention, the vehicle body is mounted in a manner achieving static and dynamic responses best calculated to enhance its primary function as a passenger carrying compartment. To this end, the forward portion of the vehicle body is formed with a pair of engine straddling depending pillars 76 and 78, the lower ends 80 and 82 of which converge beneath the engine for engagement with an elastic mounting assembly 84 establishing one point of a three-point body mounting arrangement, the other two of which are provided by primary suspension coil springs 86 and 88 extending between the rearward portion of the body and laterally opposite ends of the rear axle 6. Owing to the fact that the coil springs 86 and 88 exert no lateral control of the body relative to the rear axle, a wishbone-type strut 90 extends between the body and the axle with its laterally 90 extends between the body and the axle with its laterally alined opposite ends 92 and 94 journalled in bearings 96 and 98 formed in depending body pillars 100 and 102 and its apex 104 universally pivotally connected to the axle at 106. Because of the three-point mounting of the body, torsional stresses ordinarily encountered in conventional vehicle construction during cornering, negotiation of irregular terrain, etc., are substantially eliminated. Consequently, the body as a structural unit requires little, if any, of the additional structural elements normally required in conventional construction to cope with such torsional stresses.

According to another feature of the invention, the three-point mounting of the vehicle body relative to the driving aggregate is susceptible to location at points which coincide with the front and rear nodal points 108 and 110 (FIG. 15) of the driving aggregate in first mode-beaming deflection. In consequence, when such deflection is excited, either by engine operation or by road-induced forces imposed on the rear wheels, input to the body of such beaming deflection forces is nullified due to the location of the mounts in the positions indicated. Similarly, the connection 106 of the apex 104 of strut 90 is preferably coincident with the rear nodal point 110. In this connection, it will be apparent that substantially all of the benefits thus derived may also be accomplished by locating the body mounts and strut apex in vertical transverse planes containing the nodal points.

According to a still further and extremely significant feature of the invention, the elastic mount 84 supporting the forward portion of the body relative to the engine is designed to exhibit a natural frequency which is significantly below the lowest frequency generated by engine operation at and above idle speed. By way of example, where the lowest engine generated frequency is on the order of 100 cycles per second, the elastic mount natural frequency is preferably on the order of 10—15 cycles per second. Since the primary rear suspension springs 86 and 88 normally exhibit a natural frequency on the order of 1—2 cycles per second, vibrations excited in the entire driving aggregate are not transmitted to the body. Thus, in contrast to conventional practice, the present invention utilizes the ground rather than the vehicle body or frame as the reaction base for oscillatory vibration of the engine and, therefore, enables the utilization of body mounts selected solely for the purpose of producing optimum vibration filtration.

According to a yet another and equally significant feature, a vehicle constructed in accordance with the present invention enables establishment of separate roll axes for the body and the chassis, respectively, thereby permitting optimization of both for their primary objectives. Thus, the roll axis of the chassis is established to provide the best handling, control, and stability characteristics, while the roll axis of the body is separately located to achieve body roll deflection characteristics which contribute most to passenger comfort. By way of example, selection of a body roll axis approaching or coinciding with the center of gravity of the vehicle body, causes elimination, or marked reduction, of the tendency of the body to exhibit a roll angle responsive to lateral acceleration; yet, because the chassis roll axis is not dependent upon the body roll axis, favorable body roll characteristic is achieved without adversely affecting or compromising the roll axis of the chassis. Hence, optimum handling and stability is maintained coincidental with optimum body roll response.

However, inasmuch as zero body roll deflection may not be totally desirable or attainable, the present invention includes means for attaining any desired degree of body roll couple distribution between the front and rear wheels. To this end, as seen best in FIGS. 1, 2 and 3, the transversely extending portion 112 of a torsional roll stabilizer 114 is rotatably supported adjacent the upper ends of body pillars 76 and 78 and provided with forwardly extending legs 116 and 118 which are articulatably connected by drop links 120 and 122 to the front suspension upper control arms 22 and 24.

Since various forces excited by engine operation and road-induced impulses may also be transmitted to certain operating controls disposed within the body of the vehicle, such as the steering column, gear shift, throttle, etc., connections thereof with the engine or other parts of the driving aggregate are arranged so as to minimize or totally eliminate transmission of vibrations to the body. To this end, the steering column 124, while mounted in a fixed position within the body, is preferably connected to the vehicle steering linkage 126 by mechanism, not shown, permitting relative displacement between the driving aggregate and the body. Similarly, the gear shift lever 128 projects through the vehicle body floor 130 without physical contact therewith. As other controls such as brakes, clutch, throttle, etc., are equally susceptible by well known expedients to establishment of vibration isolating operating connections between the body and driving aggregate, detailed description thereof is omitted.

It will also be noted that the engine radiator is mounted on the engine rather than the body in order to prevent undesirable flexing of the radiator hose. Inasmuch as vehicle exhaust systems also commonly exhibit a significant tendency toward production of undesirable vibrations, in the present construction the entire exhaust system including the exhaust pipe 132, muffler 134 and tail pipe 136 are mounted exclusively on the driving aggregate. Therefore, isolation of the body from vibration generated thereby is accomplished by the body mountings 84, 86 and 88.

DESCRIPTION OF MODIFIED EMBODIMENTS

In FIGS. 5, 6, 7 and 8, there is shown a modified form of the invention in which the vehicle body 74 is mounted relative to the driving aggregate on a three-point mounting which is reversed relative to the arrangement in the preferred embodiment. To this end, the rear coil springs 86 and 88 are replaced by a transverse leaf spring assembly 138 having the central portion thereof clamped to a depending projection 140 formed on the body 74 rearwardly of axle 6. The opposite ends of spring 138 are connected to the outboard ends of axle 6 by shackles 142 and 144. The forward portion of the body 74 in turn is provided with a pair of forwardly-extending supports 146 and 148 which overlie laterally-extending projections 34 and 36 on engine 2. Interposed between projections 146, 34 and 148, 36 are a pair of elastic mounts 150 and 152 which exhibit low natural frequency comparable to the single elastic mount 84 of the preferred embodiment. It will be evident in the present construction that the transverse leaf spring 138 performs the additional function of laterally stabilizing the rear end of the body relative to the rear axle, and accordingly, the need for a lateral stabilizer strut 90 as in the preferred embodiment is eliminated.

Figure 3:
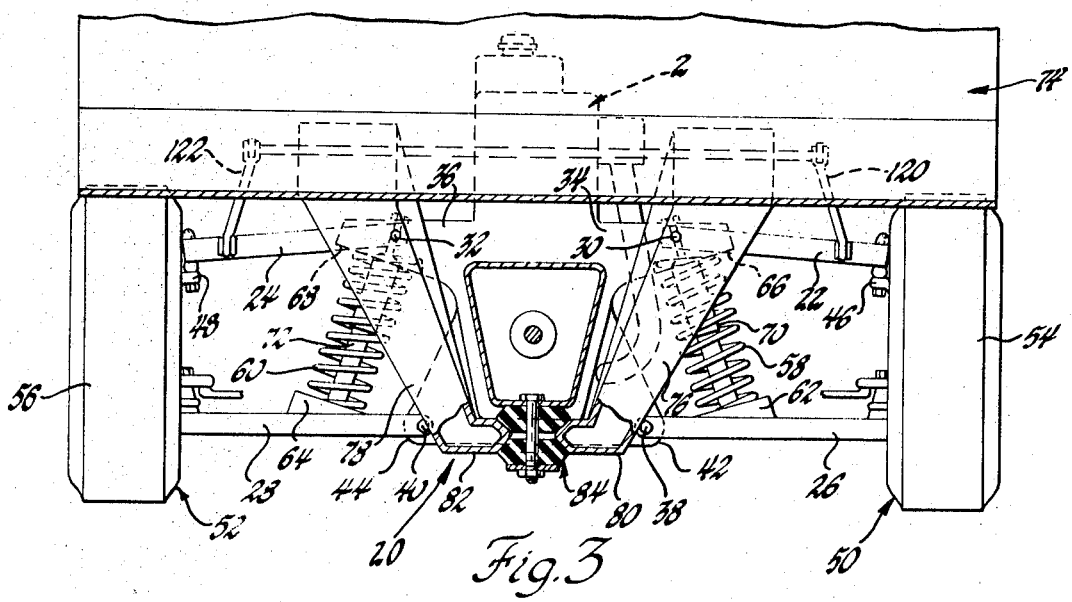
FIG. 3 is an end elevational view, partly in section, looking in the direction of arrows 3—3 of FIG. 1.
Figure 4:
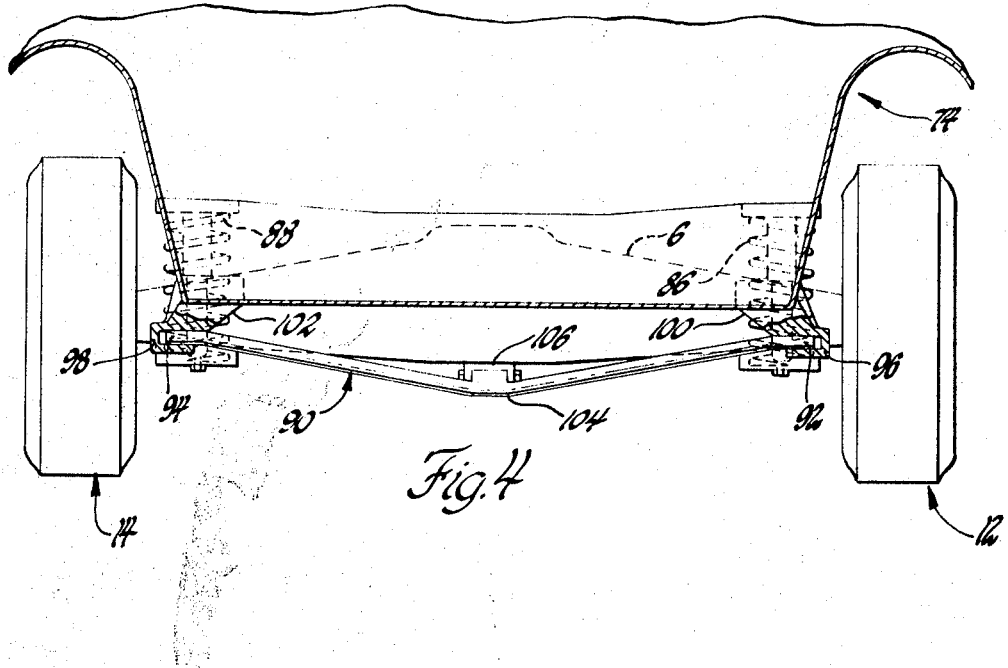
FIG. 4 is an end elevational view looking in the direction of arrows 4—4 of FIG. 1.
Figure 7:
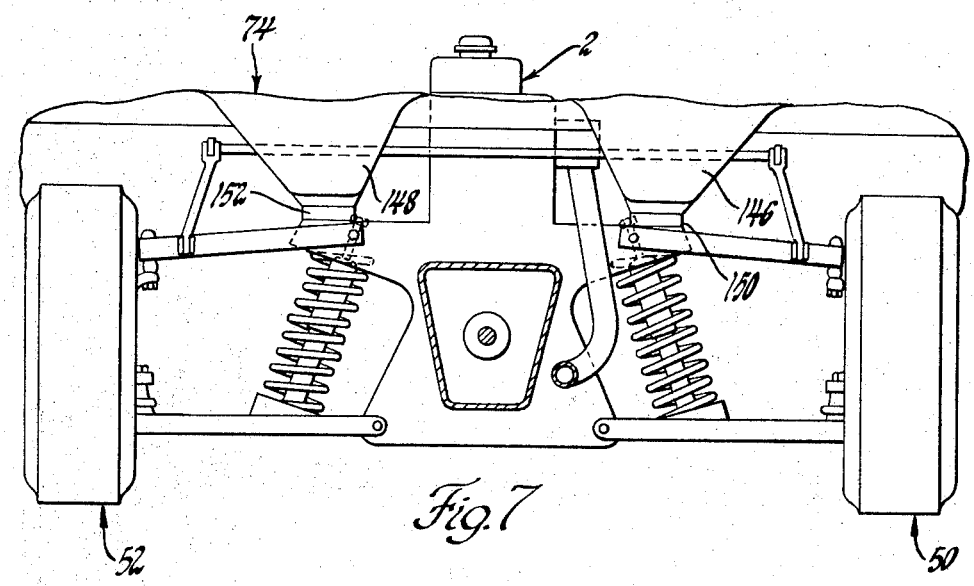
FIG. 7 is an end elevational view looking in the direction of arrows 7—7 of FIG. 5.
Figure 8:
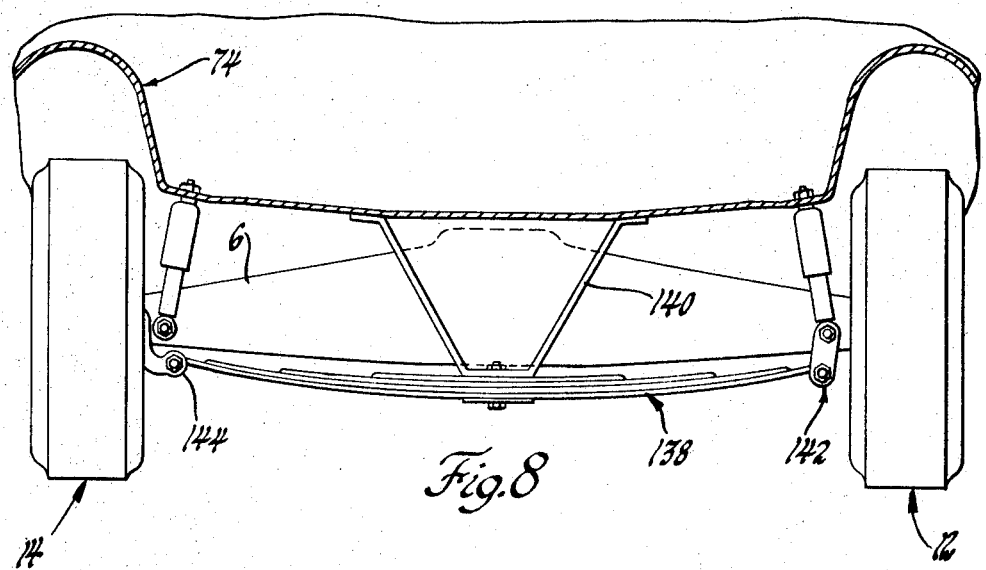
FIG. 8 is an end elevational view looking in the direction of arrows 8-8 of FIG. 5.
Figure 9:
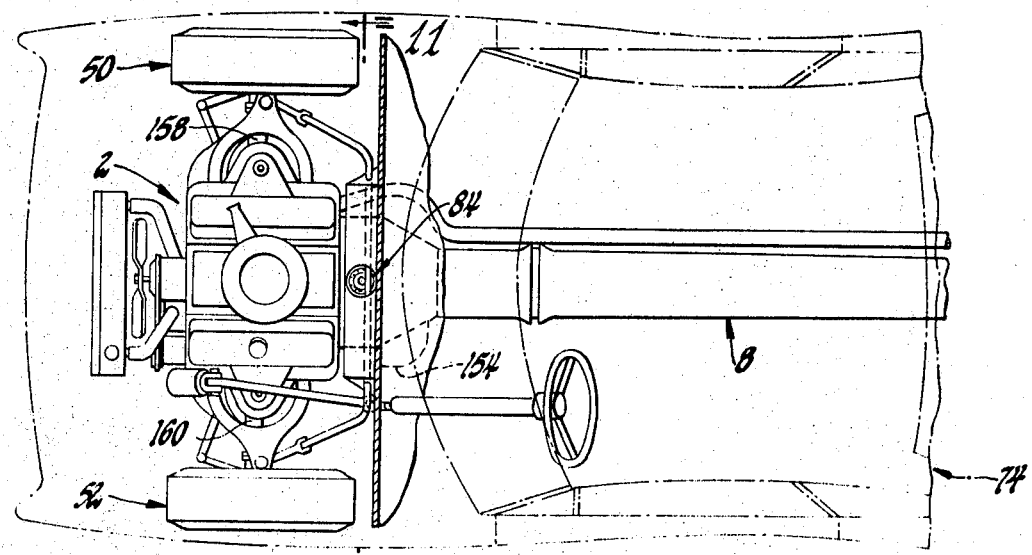
FIG. 9 is a fragmentary plan view, partly in section, showing another modified form of the invention.
Figure 10:
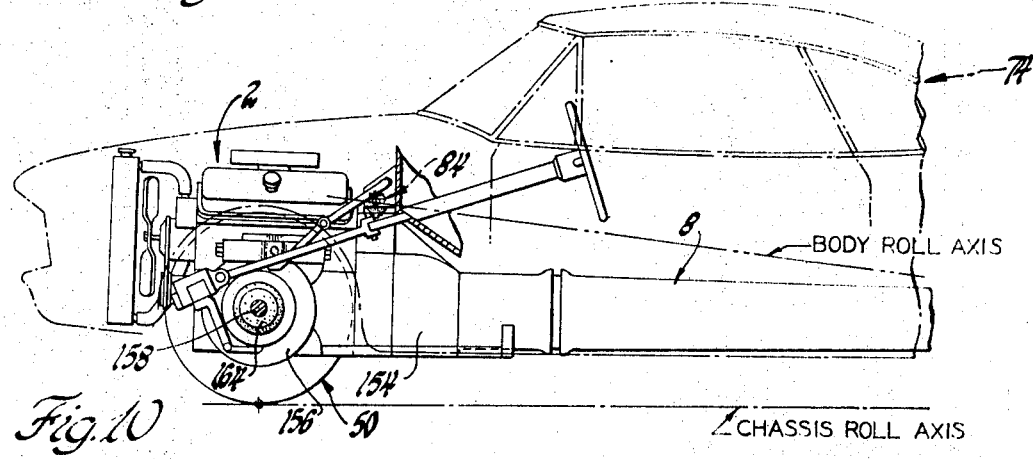
FIG. 10 is a fragmentary side elevational view of the construction shown in FIG. 9.
Figure 11:
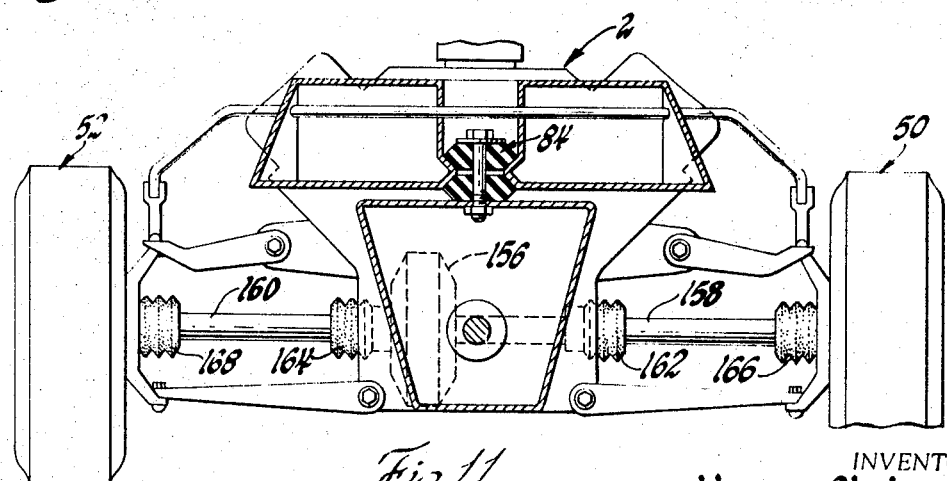
FIG. 11 is a end elevational view looking in the direction of arrows 11-11 of FIG. 9.

In FIGS. 9, 10 and 11, there is shown a further modification of the invention illustrating the utilization of a four-wheel drive. In this construction, all of the features of the preferred embodiment are retained with the addition of a transfer case 154 at one side of the transmission which extends forwardly to a differential assembly 156 on the engine block. Live axles 158 and 160 are universally connected at 162 and 164 to assembly 156 and similarly universally connected at 166 and 168 to dirigible wheels 50 and 52. It will be understood that conventional mechanism, not shown, is utilized to accomplish driving engagement and disengagement of the front wheels to provide for either two or four-wheel drive operation. Alternatively, the driving connection to the rear wheels may be eliminated, if front wheel drive only is desired.

Figure 12:
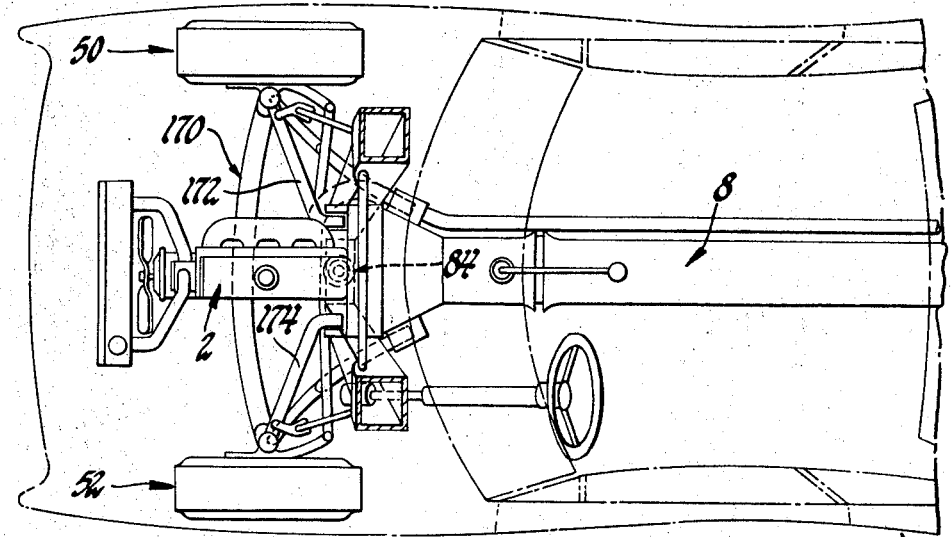
FIG. 12 is a fragmentary plan view showing a further modification of the invention.
Figure 13:
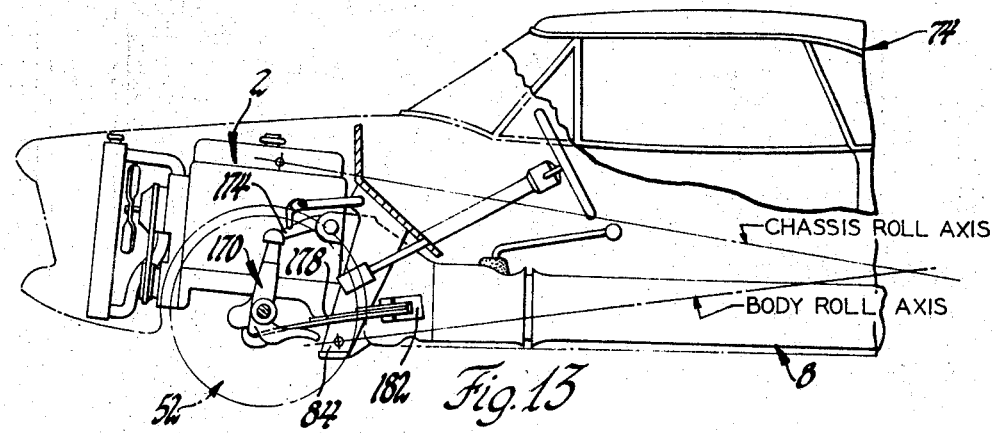
FIG. 13 is a side elevational view of the construction shown in FIG. 12.
Figure 14:
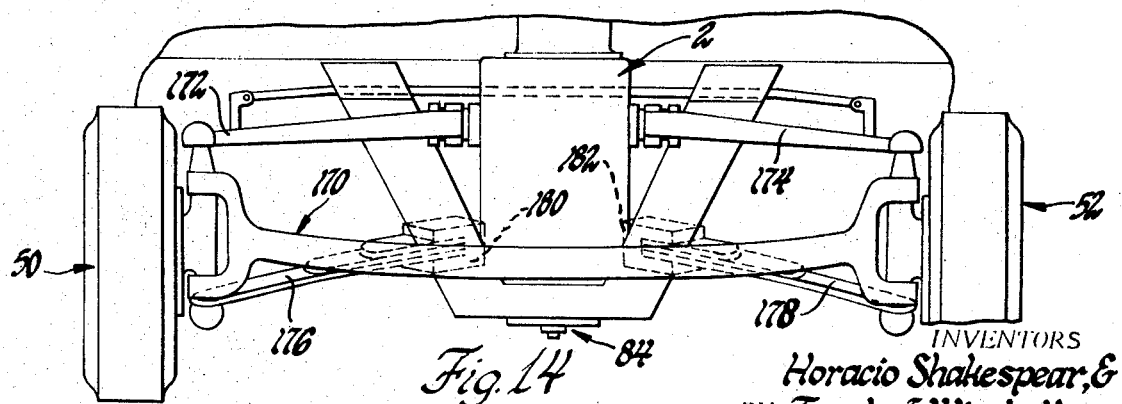
FIG. 14 is an end elevational view looking in the direction of arrows 14-14 of FIG. 12.

FIGS. 12, 13 and 14 illustrate a further modification of the invention in which a solid axle 170 replaces the wishbone independent suspension of the preferred embodiment. In this construction, axle 170 is kinematically connected to the engine end of the driving aggregate by transversely spaced forwardly and outwardly extending pivotal upper links 172, 174 and similarly directed lower cantilever leaf spring assemblies 176 and 178, the latter of which are anchored at the inboard ends at 180 and 182 on the base of the engine. It will be noted that the geometry of this form of front suspension provides a high front roll center and hence a rearwardly sloping chassis roll axis in contrast to the ground level roll axis provided by the independent suspension units of other embodiments.

From the foregoing, it will be seen that a novel and improved vehicle structural system has been devised which departs basically from heretofore conventional vehicle construction. Fundamentally, the invention achieves notable improvement in ride, comfort, and handling by departing from the usual practice of supporting the engine on the frame or body frame (in the case of an integral body frame construction). In contrast to past practice, the engine is elastically supported directly on the front suspension unit and is coupled essentially rigidly with the rear axle by the torque tube to form a unitary driving aggregate. Consequently, oscillatory vibrations of the engine are controlled by and dissipated through the pneumatic tires of the rear wheels; hence, the reaction base with respect to such impulses is the road surface rather than the vehicle body. Similarly, vertical impulses generated by the engine are to a very large extent controlled and absorbed by the front suspension unit. Additionally, since the front suspension linkage is directly connected to the engine, geometric and kinematic stability of a vehicle is achieved without dependence on the body structure to perform any function in this regard. For this reason, the body may be constructed and mounted in a manner best suited to perform its primary purpose. Thus, structural requirements such as high levels of beaming and torsional stiffness previously necessary in order to achieve overall vehicle structural integrity are greatly reduced. Further, elastic mounts for the body may be selected which exhibit sufficiently low natural frequency as to afford optimum noise and vibration isolation capability rather than requiring compromise dictated by the necessity of achieving acceptable engine support and control. Still further, since all geometric factors which influence handling and stability of a vehicle are achieved by the kinematic relationship established directly between the driving aggregate and the front suspension, the body mounts are susceptible to disposition in locations providing a separate roll axis best calculated to minimize passenger discomfort during cornering or other conditions inducing lateral acceleration. In this connection, it will of course, be evident that the roll axis of the total chassis (the front suspension and driving aggregate) is similarly open to precise establishment best calculated to optimize stability and handling. Thus, for example, the body mounts could be located so that the roll axis defined thereby coincides with the center of gravity of the body in which case lateral acceleration incident to cornering or turning will produce negligible body roll. Yet at the same time, the same lateral acceleration acting on the chassis influences the handling and stability of the overall vehicle only in accordance with the geometric influence of the separate roll axis of the chassis. In this connection, although a separate chassis roll axis exists, due to the fact that the driving aggregate is retained in an essentially fixed angular position by the rear axle and wheels, roll deflection of the driving aggregate about such axis responsive to lateral acceleration is, within normal limits of vehicle operation, limited to that accommodated by compression deflection of the rear tire on the outboard side of a turn. Consequently the actual roll angle of the body relative to the ground responsive to lateral acceleration is essentially determined by the relation of the center of gravity of the body to the body roll axis rather than being the sum of the body roll angle plus a significant chassis roll angle.

Finally, as seen in FIG. 16, since the relatively massive engine end of the driving aggregate is located above the compound elastic system defined by the front wheel pneumatic tires in series with the primary suspension springs and below the elastic front body mount, the mass of the engine functions effectively as an inertia damper minimizing transmission to the body of road impact on the front wheels. The manifest contrast with conventional arrangements illustrated in FIG. 17 will be readily apparent.

We claim:

1. A motor vehicle comprising an essentially rigid aggregate including an engine, transmission, torque tube and axle housing having a first pair of wheels coaxially mounted thereon, a second pair of normally coaxial dirigible wheels spaced longitudinally from said first pair of wheels a suspension unit kinematically and elastically supporting the engine end of said aggregate on said dirigible wheels, drive means connected to said dirigible wheels, a body disposed over said aggregate, and elastic means directly supporting said body on said aggregate so that the roll axis of the latter is entirely independent of the roll axis of the former.

2. A motor vehicle comprising an essentially rigid driving aggregate including an engine, transmission, torque tube and axle housing having driving wheels coaxially mounted thereon, a pair of normally coaxial dirigible wheels spaced longitudinally from said driving wheels, a suspension unit kinematically and elastically supporting the engine end of said aggregate on said dirigible wheels, a body disposed over said aggregate, elastic means directly supporting said body on said aggregate in essentially torsionally stress free relation and providing a roll axis distinct from the roll axis of said aggregate, said elastic means defining an effective three-point mounting, and means operative to resist deflection of said body about its roll axis including a torsional roll stabilizer extending transversely of said body.

3. A motor vehicle comprising an essentially rigid driving aggregate including an engine, transmission, torque tube and axle housing having driving wheels coaxially mounted thereon, a pair of normally coaxial dirigible wheels spaced longitudinally from said driving wheels, a suspension unit kinematically and elastically supporting the engine end of said aggregate on said dirigible wheels, a body disposed over said aggregate, elastic means directly supporting said body on said aggregate in essentially torsionally stress free relation and providing a roll axis distinct from the roll axis of said aggregate, said elastic means defining an effective three-point mounting wherein one of said three points is located at the engine end of said aggregate and the other two of said three points are located at the end of said vehicle opposite said engine in laterally equally oppositely spaced relation to the vehicle centerline.

4. The invention of claim 3 including torsionally active means interconnecting the forward portion of said body with said suspension unit operative to resist deflection of said body about its roll axis.

5. The invention of claim 4 wherein said suspension unit comprises vertically swingable wheel deflection control arms.

6. A motor vehicle comprising an essentially rigid driving aggregate including an engine, transmission, longitudinally extending torque tube and transversely extending axle housing having a pair of driving wheels coaxially mounted at opposite ends thereof, means extending through said torque tube operatively connecting said wheels with said transmission, a pair of normally coaxial dirigible wheels spaced longitudinally from said driving wheels in tracking alinement therewith, means connecting said dirigible wheels to said transmission, a suspension unit kinematically connecting said dirigible wheels directly to the engine end of said aggregate, said unit including elastic means directly supporting said engine end relative to said wheels, a body disposed over said aggregate, and elastic means directly supporting said body on said aggregate in a manner providing an effective three-point mounting, one of which points is located near one end of the aggregate in substantial vertical alinement with the longitudinal centerline of the vehicle and the other two points being located near the other end of the aggregate in laterally spaced relation to the vehicle centerline.

7. A motor vehicle comprising an essentially rigid driving aggregate including an engine, transmission, torque tube and axle housing having driving wheels coaxially mounted thereon, a pair of normally coaxial dirigible wheels spaced longitudinally from said driving wheels in tracking alinement therewith, means articulatably connecting said dirigible wheels to the engine end of said aggregate in a manner maintaining the latter in laterally stable relation with the former, primary elastic means directly supporting said engine end on said last mentioned means, a body disposed over said driving aggregate, additional primary elastic means directly supporting one end of said body at laterally spaced apart points on said axle housing, and secondary elastic means directly supporting the other end of said body on the engine end of said aggregate at an effective center vertically alined with the vehicle centerline, the natural frequency of said secondary elastic means being substantially below any imposed frequency generated by engine operation at and above idle speed.

8. A motor vehicle comprising an essentially rigid driving aggregate including an engine, transmission, torque tube and axle housing having driving wheels coaxially mounted thereon, drive means within said torque tube and axle housing operative to transmit engine torque from said transmission to said driving wheels, a pair of normally coaxial dirigible wheels spaced longitudinally from said driving wheels at opposite sides of the engine end of said aggregate, suspension linkage articulatably connecting said engine end relative to said dirigible wheels in a manner maintaining the latter in normal tracking alinement with said driving wheels, primary elastic means extending directly between said engine end and said suspension linkage, said aggregate being susceptible to first mode vertical vibratory beam flexure defining nodal points located respectively substantially at the engine and substantially at the axle housing, a body disposed over said driving aggregate, and elastic means directly supporting said body on said aggregate at effective centers located substantially in transverse vertical planes containing said nodal points.

9. The invention of claim 8 wherein said elastic means are tuned to natural frequencies substantially below any imposed frequency generated by engine operation at and above idle speed.

10. The invention of claim 8 wherein said elastic means define an effective three-point mounting, one of which is located in substantial vertical alinement with one of said nodal points and the other two are located at transversely opposite sides of the other nodal point.

11. The invention of claim 10 wherein said one of said mountings define an effective center substantially coincident with the nodal point at the engine end of said aggregate.

12. A motor vehicle comprising an essentially rigid driving aggregate including an engine, transmission, torque tube and axle housing having driving wheels coaxially mounted thereon, drive means within said torque tube and axle housing operative to transmit engine torque from said transmission to said driving wheels, a pair of normally coaxial dirigible wheels spaced longitudinally from said driving wheels at opposite sides of the engine end of said aggregate, suspension means articulatably connecting said engine end relative to said dirigible wheels in a manner maintaining the latter in laterally stable relation with the former and normal tracking alinement with said driving wheels, primary elastic means directly supporting said engine end on said suspension means, said aggregate being susceptible to first mode vertical vibratory beam flexure defining nodal points located respectively substantially at the engine and substantially at the axle housing, a body disposed over said driving aggregate, additional primary elastic means directly supporting one end of said body on said axle housing in substantially transverse alinement with said last mentioned nodal point, and secondary elastic means directly supporting the other end of said body on the engine end of said aggregate at an effective center in substantial vertical alinement with said first mentioned nodal point.

13. The invention of claim 12 wherein the secondary elastic means is tuned to a natural frequency substantially below any imposed frequency generated by engine operation at and above idle speed.

14. the invention of claim 12 wherein said suspension means includes a solid axle interconnecting said dirigible wheels.

15. The invention of claim 12 wherein said additional primary elastic means comprises a transverse leaf spring interconnecting the axle housing with the adjacent end of said body.

16. The invention of claim 12 wherein said additional primary elastic means comprises laterally spaced-apart coil springs and including linkage means restraining lateral movement of said one end of said body relative to said axle housing.

17. The invention of claim 16 wherein said linkage means includes a universal connection with said axle housing located at essentially the nodal point adjacent thereto.

18. In a motor vehicle of the type having a body defining a passenger compartment with a longitudinal axis, coaxial driving wheels, a reciprocating engine and transmission, and dirigible wheels longitudinally spaced from the drive wheels, characterized by a drive unit composed of a rear axle housing having said driving wheels on the outboard ends thereof, a torque tube rigidly connected at one end to said axle housing and extending forwardly therefrom, the torque tube and rear axle housing together having a substantial energy dissipation capability on vertical flexural vibration, a relatively massive reciprocating engine and transmission unit rigidly attached to the torque tube, and means within said torque tube and axle housing operatively transmitting engine torque to said driving wheels, said engine being unbalanced at least as to vertical force pulsations and generating such pulsations at varying frequencies during normal vehicle operation, a front support structure attached to the engine and transmission unit, a pair of dirigible wheels disposed at opposite sides of said engine in normally coaxial relation, a suspension assembly elastically sustaining the frame structure on the wheels in laterally stable relation, whereby during engine operation at varying speeds the engine, transmission, torque tube and rear axle vibrate as a unit in vertically freely movable condition and undergo energy dissipating vertically vibratory beam flexure defining nodal points of vertical vibration located substantially at the engine and substantially at the axle housing, resilient elements sustaining the body at substantially its longitudinal axis from substantially the nodal point at the engine and sustaining the body outboard its longitudinal axis on each side thereof from substantially the nodal point at the axle housing.

19. The invention of claim 18 including operating control elements within said body connected to the engine, transmission and dirigible wheels in a manner insensitive to vibratory movement of said engine, transmission and dirigible wheels relative to said body.

20. The invention of claim 18 including an engine exhaust system extending longitudinally of said vehicle and supported entirely on said rigid aggregate.

21. A motor vehicle comprising, an essentially rigid driving aggregate including an engine, transmission, torque tube and axle housing having driving wheels coaxially mounted thereon, drive means within said torque tube and axle housing operative to transmit engine torque from said transmission to said driving wheels, a pair of normally coaxial dirigible wheels spaced longitudinally from said driving wheels at opposite sides of the engine end of said aggregate, upper and lower laterally oppositely directed projections formed on said engine, suspension means including vertically spaced laterally directed control arms pivotally mounted at their inboard ends on said projections connecting said engine relative to said dirigible wheels in laterally stable relation therewith, primary elastic means comprising coil springs extending between one of said arms at each side of said engine and the vertically adjacent projection directly resiliently supporting said engine on said suspension means, said aggregate being susceptible to first mode vertical vibratory beam flexure defining nodal points located substantially at the engine and substantially at the axle housing, a body disposed over said driving aggregate, additional primary elastic means directly supporting one end of said body on said axle housing in substantially transverse alinement with said last mentioned nodal point, and secondary elastic means directly supporting the other end of said body on the engine end of said aggregate in substantially transverse alinement with said first mentioned nodal point.

22. The invention of claim 21 wherein said secondary elastic means is mounted on the lower surface of said engine and connected in tension to said body by depending engine-straddling pillars formed on said body.

23. The invention of claim 21 wherein said secondary elastic means is mounted on the upper surface of said engine.

24. The invention of claim 21 wherein each of the upper of said laterally oppositely directed projections formed on said engine is substantially transversely alined with the nodal point at the engine end of said aggregate.

25. The invention of claim 24 wherein said additional primary elastic means comprises a transverse leaf spring and said secondary elastic means comprises transversely spaced resilient elements supported on said upper laterally oppositely directed projections.